(12) United States Patent
Teraoka (10) Patent No.: US 7,213,053 B2
(45) Date of Patent: May 1, 2007

(54) METHOD AND SYSTEM FOR PROVIDING ELECTRONIC INFORMATION AND COMPUTER PROGRAM THEREFOR

(75) Inventor: Yuji Teraoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 903 days.

(21) Appl. No.: 10/351,612

(22) Filed: Jan. 27, 2003

(65) Prior Publication Data
US 2003/0158612 A1    Aug. 21, 2003

(30) Foreign Application Priority Data
Jan. 29, 2002    (JP) ............................. 2002-020290

(51) Int. Cl.
*G06F 15/173* (2006.01)
(52) U.S. Cl. .................................... 709/206
(58) Field of Classification Search ................ 709/206, 709/246, 217; 706/45; 707/104
See application file for complete search history.

(56) References Cited

U.S. PATENT DOCUMENTS

| | | | | |
|---|---|---|---|---|
| 5,301,314 | A * | 4/1994 | Gifford et al. .............. | 707/101 |
| 6,240,420 | B1 * | 5/2001 | Lee ............................ | 707/102 |
| 6,434,607 | B1 * | 8/2002 | Haverstock et al. ........ | 709/217 |
| 6,510,431 | B1 * | 1/2003 | Eichstaedt et al. ............ | 707/10 |
| 6,542,897 | B2 * | 4/2003 | Lee ............................. | 707/102 |
| 6,564,227 | B2 * | 5/2003 | Sakakibara et al. ...... | 707/104.1 |
| 6,601,159 | B1 * | 7/2003 | Smith et al. .................. | 712/29 |
| 6,701,376 | B1 * | 3/2004 | Haverstock et al. ........ | 709/246 |
| 6,856,979 | B1 * | 2/2005 | Chefalas et al. ............. | 706/47 |
| 6,938,000 | B2 * | 8/2005 | Joseph et al. ................ | 705/26 |

FOREIGN PATENT DOCUMENTS

| | | |
|---|---|---|
| JP | 2001-136272 | 5/2001 |
| JP | 2001-331196 | 11/2001 |
| JP | 2001-350832 | 12/2001 |

* cited by examiner

*Primary Examiner*—David Y. Eng
(74) *Attorney, Agent, or Firm*—Sughrue Mion, PLLC (57) ABSTRACT

To provide a system for providing information that allows operators who orally answer questions about certain products from users to deal with the users quickly and effectively. The level of information disclosure is specified for each electronic information to be used for customer support in an information server. In response to the reception of a request for information from an operator terminal, knowledge levels of the user and the operator are determined. The associated electronic information is edited according to rules of providing information that are determined according to the specified knowledge level. The edited version of the electronic information is supplied to the operator terminal. The extent to which information will be disclosed varies according to the level of the knowledge of the user or the operator for a certain product.

16 Claims, 7 Drawing Sheets

| USER LEVEL | OPERATOR LEVEL | THE LEVEL OF INFORMATION DISCLOSURE |
|---|---|---|
| 1 | 1 | 0 |
| 2 | 1 | 2 |
| 3 | 1 | 3 |
| 1 | 2 | 1 |
| 2 | 2 | 2 |
| 3 | 2 | 3 |

METHOD AND SYSTEM FOR PROVIDING ELECTRONIC INFORMATION AND COMPUTER PROGRAM THEREFOR

CROSS REFERENCE TO RELATED APPLICATION

The present application claims priority from Japanese Application No. 2002-20290 filed Jan. 29, 2002, the disclosure of which is hereby incorporated by reference herein.

BACKGROUND OF THE INVENTION

The present invention relates to a mechanism for efficiently providing requested electronic information to an inquiring person or to an operator who orally answers questions and gives directions to inquiring persons.

Manufacturing and sales companies usually have a department, division, or unit that functions as a contact point for potential users and existing users. It receives questions, inquiries, opinions, and requests for information about products they manufacture or sell, through communications. Thus, many companies train personnel to have the skills and knowledge necessary to provide adequate information to inquiring persons. Those who satisfy certain criteria are appointed as "operators" to assist the inquiring persons.

The inquiries received by the operators through communications are miscellaneous, ranging from how to use a product to the price of a product, a shipping deadline, and complaint. Besides, recent product developments provide many diverse products designed for the same purpose. Even the products that are similar on the surface may use various different technologies and techniques. This often increases the number of product items.

For example, as to printing devices or printers, various products are manufactured and sold that use different ink delivery systems and/or head driving mechanisms for different ink colors. Consequently, company operators are required to have an extensive and in-depth knowledge of their products to assist the users in a satisfactory manner. The acquisition of such knowledge requires a reasonable training system and time. This imposes a heavy burden on people who want to be an operator and on companies with future operators.

Recently manufactured and distributed products have become more multifaceted and the life cycle of these products has become shorter. These circumstances further increase the companies' liabilities to assist their users in a satisfactory manner. In order to reduce the burden associated with operator services, sample answers may be displayed on a computer screen in front of each operator. Operators may use the sample answers while they give directions to users. However, the sample answers make the operators dependent on them. The operators may respond in a similar manner whenever they handle inquiries, regardless of whether they are received from knowledgeable users or from users with very little knowledge.

On the other hand, the improved information infrastructure of, for example, computer networks keeps users up to date. Some users have a wealth of knowledge about certain products. In such a case, automatic responses based on the sample answers may sometimes result in unnecessary waste of time for both operators and users. This tendency is particularly apparent when the operator is less knowledgeable than the inquiring user. Thus, it is desired for operators to respond differently on a case-by-case basis according to the knowledge of themselves or of users.

To provide the operators with the chance to gain a lot of practical experience, it is desirable in some cases that the operators are given user support information to be used to assist users along with other information associated with the user support information.

Furthermore, users may access a website of a company that provides information about a product they have purchased, without any help of operators. For example, a company may operate a website carrying an electronic file with information about how to avoid problems for a given product to allow users to download the file directly. In such a case, knowledgeable users can download unnecessary information if the electronic file is prepared without consideration of users' knowledge. This reduces motivation of users to access a website and download an electronic file.

The present invention is made against this background and a primary object thereof is to provide a mechanism for efficiently providing requested electronic information.

SUMMARY OF THE INVENTION

The present invention provides a method and a system for providing information and a computer program therefor.

A first method for providing information according to the present invention is a method for providing electronic information, said method being carried out on a computer system having an information storage device in which electronic information is recorded, the electronic information being to be supplied to a person requesting the information, said method comprising the steps of: specifying rules of providing information according to different knowledge levels; determining a knowledge level of the person requesting the information in response to the reception of a request for information; editing the electronic information that corresponds to the received request for information according to a rule of providing information designated to the knowledge level obtained from the information storage device; and supplying the edited electronic information to the person requesting the information.

The term "electronic information" as used herein includes all information that the computer system can handle. The term "knowledge level" as used herein is a quantified measure of the degree of knowledge about the electronic information. The knowledge level is typically represented by numerical values. The term "rules of providing information" as used herein are rules of providing the electronic information, such as how it is displayed on the side of the person requesting information and what the size of the data available for downloading is.

A second method for providing information according to the present invention is a method for providing electronic information, said method being carried out on a computer system having a communication mechanism and an information storage device in which electronic information for dialogue support is recorded, the communication mechanism performing two-way communications with an operator terminal that is manipulated by an operator who orally answers questions about a predetermined product from an inquiring person, said method comprising the steps of: specifying rules of providing information according to different knowledge levels for each electronic information; receiving a request for information from the operator terminal through the communication mechanism; determining a knowledge level of the inquiring person in response to the reception of the request for information; editing the electronic information that corresponds to the received request for information according to a rule of providing information designated to the knowledge level that has been determined; and supplying the edited electronic information to the operator terminal through the communication mechanism.

The knowledge level of the inquiring person is automatically determined by speech recognition of answers to questions from the inquiring person who follows directions given by the operator.

In said step of determining the knowledge level, a knowledge level of the inquiring person and a knowledge level of the operator may be determined and the electronic information may be edited according to the rules of providing information based on the knowledge levels.

A first system for providing electronic information according to the present invention comprises a communication mechanism for two-way communications with an information processing terminal that is manipulated by a person requesting information; an information storage device in which electronic information to be supplied to the person requesting information is recorded; setting means for specifying rules of providing information according to different knowledge levels; request for information receiving means for receiving a request for information from the information processing terminal through said communication mechanism; knowledge level determination means for determining a knowledge level of the person requesting information in response to the reception of the request for information by said request for information receiving means; information editing means for editing the electronic information that corresponds to the received request for information according to a rule of providing information designated to the knowledge level determined by said knowledge level determination means; and information output means that produces the electronic information edited by said information editing means to the information processing terminal through said communication mechanism.

In the first system for providing the electronic information, said information editing means may be configured in such a manner that said information editing means edits the electronic information according to a rule of providing information that varies a range or a size of the portion to be read of one electronic information recorded in said information storage device, in accordance with each of the knowledge levels.

When it is assumed that said information processing terminal is connected to an information display unit, the electronic information may be an electronic document that can be displayed on the information display unit and the electronic document may contain a point of regard region, the contents within the point of regard region being displayed in a different display appearance from the remainders of the same electronic document. In such a case, said information editing means edits the electronic information according to a rule of providing information that varies the point of regard region in accordance with each of the knowledge levels. The knowledge levels may include a first level at which only a summary of the electronic document is displayed, a second level at which an area which is intended to be read by the person requesting information and an area to be skipped are distinguished, a third level at which the skipped area is displayed in a different manner from the read area, and a fourth level at which all areas are displayed.

The electronic information may be two or more files which are hierarchically arranged in a predetermined order in said information storage device. In such a case, said information editing means edits the electronic information according to a rule of providing information that varies the order of reading the files in accordance with each of the knowledge levels. To this end, less files are to be read for a relatively higher knowledge level.

A second system for providing electronic information according to the present invention comprises a communication mechanism for two-way communications with an operator terminal that is manipulated by an operator who orally answers questions about a predetermined product from an inquiring person; an information storage device in which electronic information for dialogue support is recorded; setting means for specifying rules of providing information according to different knowledge levels for each electronic information; request for information receiving means for receiving a request for information from the operator terminal through said communication mechanism; knowledge level determination means for determining a knowledge level of the inquiring person in response to the reception of the request for information by said request for information receiving means; information editing means for editing the electronic information that corresponds to the received request for information according to a rule of providing information designated to the knowledge level determined by said knowledge level determination means; and information output means that produces the electronic information edited by said information editing means to the operator terminal through said communication mechanism.

Said knowledge level determination means may determine a knowledge level of the inquiring person and a knowledge level of the operator. Alternatively, it determines a knowledge level of the inquiring person according to the type and/or the number of technical terms contained in a dialogue between the user and the operator. For the latter case, in order to achieve automated operations, it is preferable that said knowledge level determination means comprises speech recognition means that extracts a technical term contained in the dialogue by means of speech recognition.

A first computer program according to the present invention is for making a computer operate as the above-mentioned first system for providing electronic information, in which the computer has a communication mechanism for two-way communications with an information processing terminal that is manipulated by a person requesting information and an information storage device in which electronic information to be supplied to the person requesting information is recorded.

A second computer program according to the present invention is for making a computer operate as the above-mentioned second system for providing electronic information, in which the computer has a communication mechanism for two-way communications with an operator terminal that is manipulated by an operator who orally answers questions about a predetermined product from an inquiring person, and an information storage device in which electronic information for dialogue support is recorded.

BRIEF DESCRIPTION OF THE DRAWINGS

FIGS. 4A through 4C shows page examples of an electronic manual that are to be displayed on an operator terminal according to the level of information disclosure, in which

DETAILED DESCRIPTION OF THE PREFERRED EMBODIMENT

An embodiment of the present invention is described for the case in which the present invention is applied to a system for providing electronic information in response to a request from a user and an operator who deals with users over the phone. The electronic information to be supplied is various kinds of information about printing device products. The system for providing information according to this embodiment may be administered by a manufacturer, supplier, distributor, vendor, retailer or a contract administrator.

<Entire Configuration>

Figure 1:
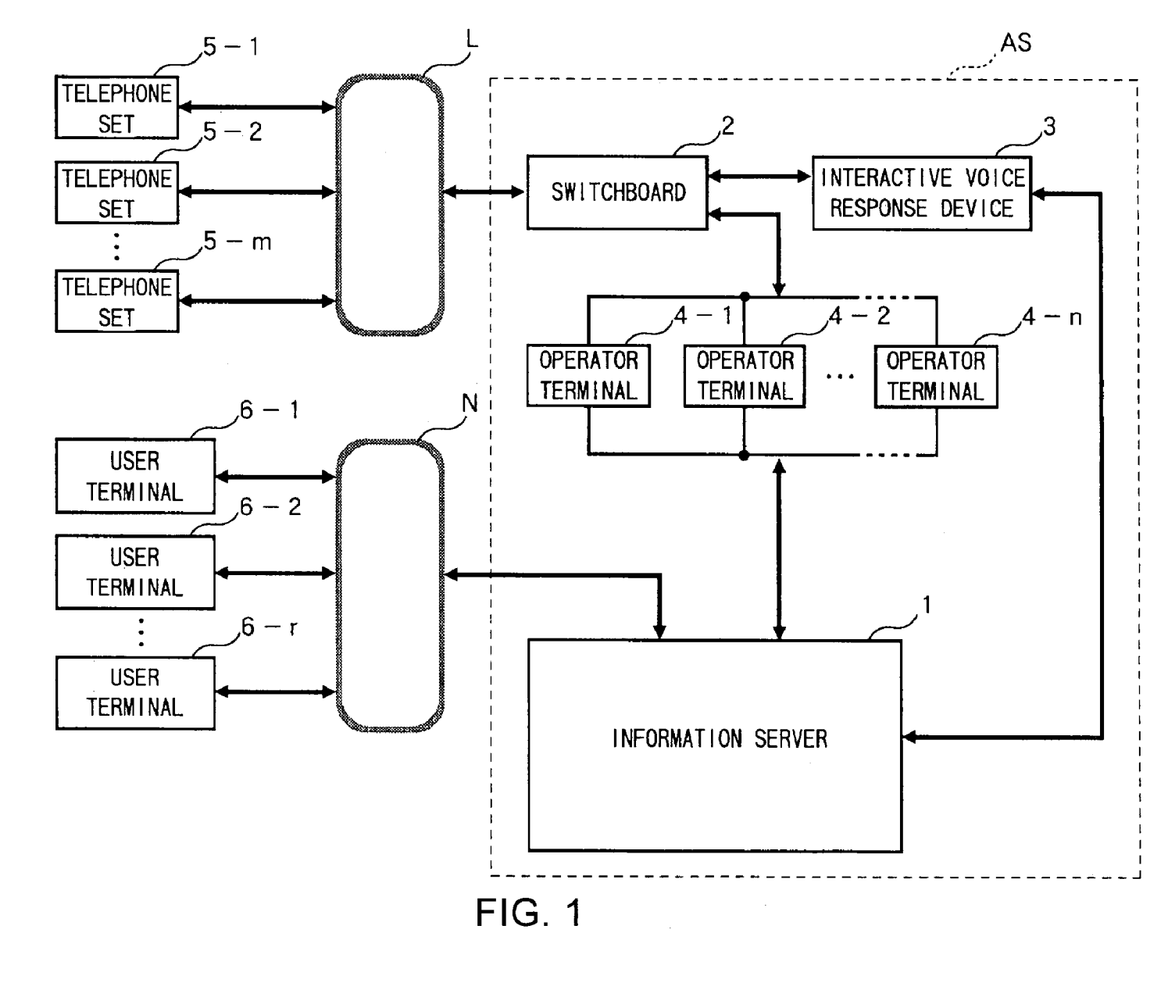
FIG. 1 is a block diagram showing an entire configuration of a system for providing information to which the present invention is applied.

FIG. 1 shows an entire configuration of a system for providing information AS. The system for providing information AS comprises an information server 1 which is an example of an electronic information system of the present invention, a switchboard 2, an interactive voice response device 3, and operator terminals 4-1 to 4-n (n is a suffix which depends on the total number of the operator terminals and which is a natural number of at least two; the suffix is omitted hereinafter for simplification) that are provided for operators, one for each operator. The operator terminals 4 and the information server 1 are connected to each other through an internal network. The information server 1 is also connected to a computer network N through the internal network. The computer network N is connected to user terminals 6-1 to 6-r (r is a suffix which is a natural number of at least two; the suffix is omitted hereinafter for simplification) that are manipulated by users. The user terminal 6 may be a personal computer having communication and browsing functions. A user is allowed to access the information server 1 from a user terminal 6 to browse various digital contents about a printing device.

The switchboard 2 is connected to a public telephone network L provided by, for example, Nippon Telegraph and Telephone Corporation. The switchboard 2 receives calls from telephone sets 5-1 to 5-m (m is a suffix which is a natural number of at least two; the suffix is omitted hereinafter for simplification) of the users and transfers the call to the interactive voice response device 3 or one of the operator terminals 4.

Next, the individual components of the system for providing information AS are described.

<Information Server>

The information server 1 is achieved by the cooperation of hardware components of a computer and a predetermined computer program. The computer is connected to an input device for data entry and a high-capacity storage device such as a hard disk. The computer program is recorded on a computer-readable recording medium (portable memory or a semiconductor memory such as a RAM or the above-mentioned storage). More specifically, various functions and features to provide electronic information are achieved on the computer and on the storage device when a CPU (arithmetic processor) in a computer reads a computer program and executes it.

Figure 2:
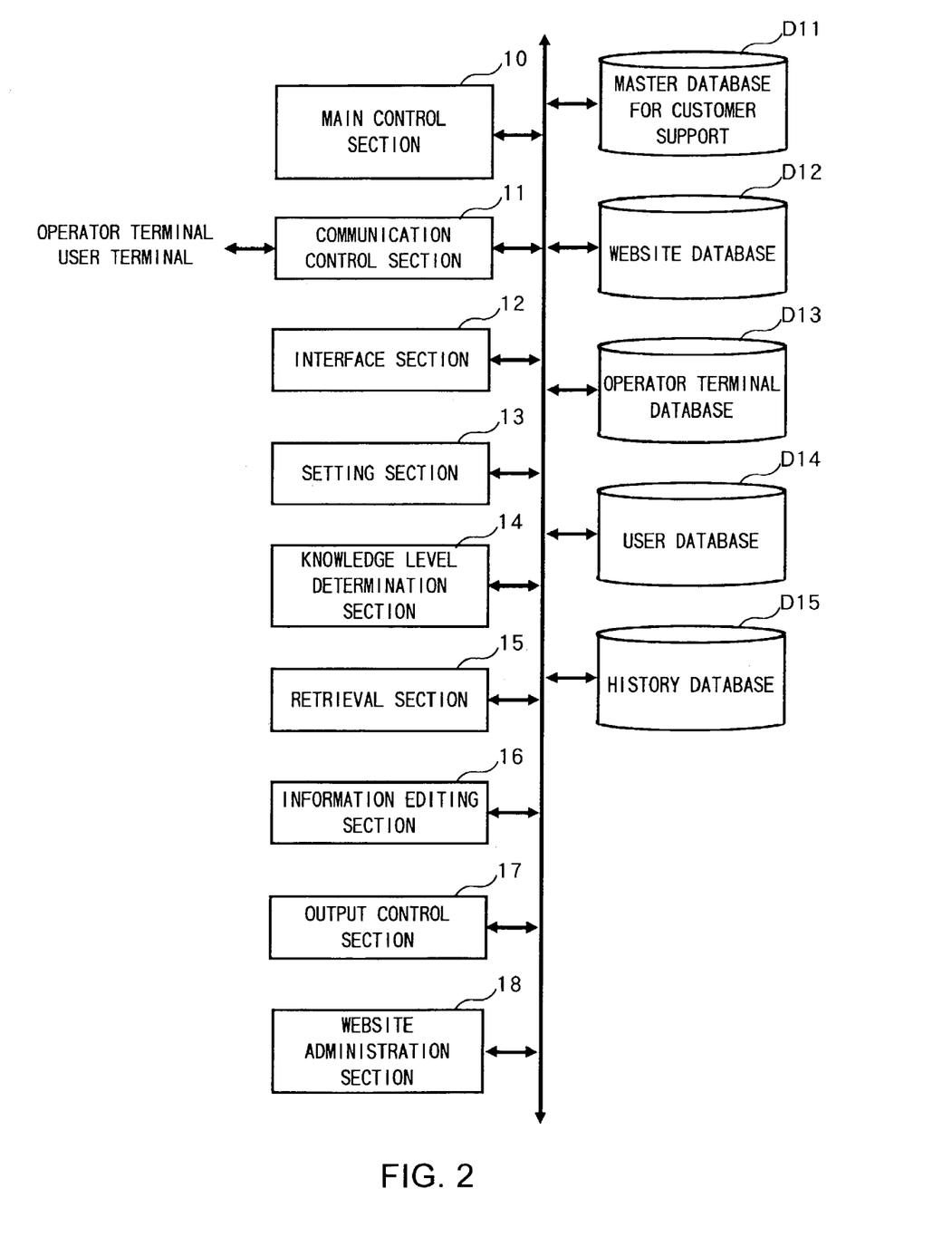
FIG. 2 is a functional block diagram of a information server.

In this embodiment, as shown in FIG. 2, functions and features of a main control section 10, a communication control section 11, an interface section 12, a setting section 13, a knowledge level determination section 14, a retrieval section 15, an information editing section 16, an output control section 17, and a website administration section 18 are achieved on the computer. In addition, a master database for customer support D11, website database D12, an operator terminal database D13, a user database D14, and a history database D15 are maintained on the storage device.

The master database for customer support D11 is hierarchically organized and contains a master copy of data for customer support that are to be displayed on display units of the operator terminals 4. The master copy of data as used herein refers to electronic information (data) before being subjected to processing and editing. For example, detailed electronic manuals for each printing device are hierarchically recorded on the master database for customer support D11. More specifically, each electronic manual is divided into subject areas for easy reference, such as an operation-based reference explaining the basic operation of a printing device, a function-based reference explaining details of functions and features of a printing device, and a trouble-shooting-based reference explaining how problems can be solved. Keywords, which form an hierarchical vocabulary, are assigned to each page of the manual. A keyword at a lower level always follows one associated keyword at an immediately higher level. Thus, more keywords appear at a lower level of the hierarchy.

The website database D12 contains electronic manuals for each printing device which have been manipulated for user downloading, referral to various printing devices. The website database D12 also contains frequently asked questions (FAQs) and their answers. The operator terminal database D13 contains identification information of all operator terminals 4 and operators that are administered in the system for providing information AS. The user database D14 contains identification information of users who have used this system. The history database D15 contains the history of responses to requests for information along with the date and time each request was received and the identification information of each requesting person (user/operator).

The main control section 10 receives requests for information from the operator terminals 4 and the user terminals 6 and controls the overall operations of the functional sections 11 to 18 in the information server 1 in response to each request for information. The main control section 10 can differentiate between requests for information from operators and requests for information from users based on terminal identification information received upon request, for example.

The communication control section 11 controls two-way communications between the operator terminals 4 on the internal network and the user terminals 6 connected to the computer network N according to a predetermined protocol. The interface section 12 allows exchange of data with peripheral devices connected to the computer, such as a data input device, a display unit, a storage device, and a printer.

Figure 3:
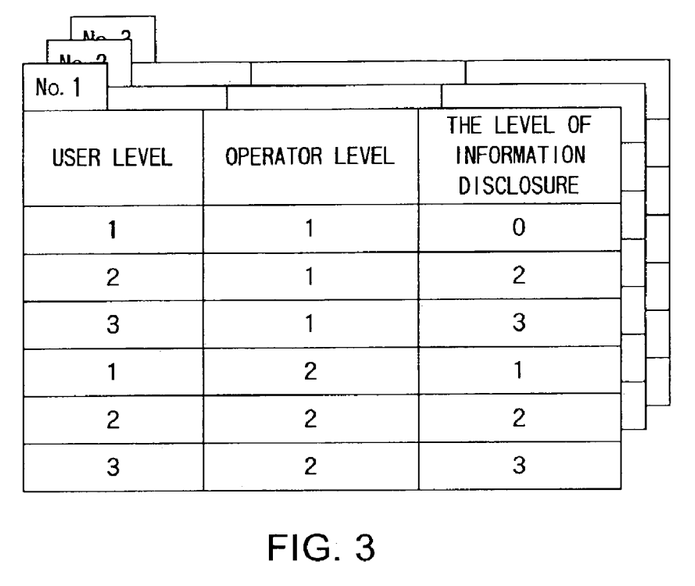
FIG. 3 is a view showing an example of a rule table containing the rules for information services.

The setting section 13 specifies the rules of providing information to suit a level of knowledge that is entered by, for example, a server administrator for each electronic information. The rules of providing information determine how the data for customer support and the website data are provided. The specified results are recorded as a "rule table" in the master database for customer support D11 or the website database D12 for the data for customer support and for the website data, respectively. An example of the rule table is shown in FIG. 3.

In this embodiment, the rules of providing information are specified in view of both knowledge levels of users ("user levels") and of operators ("operator levels"). More specifically, the user levels are labeled "1", "2", and "3" while the operator levels are labeled "1" and "2". One of the three user levels and one of the two operator levels are entered as the knowledge levels. A smaller value means a higher level of knowledge about printing devices. Consequently, the user levels and the operator levels are combined for some cases, and either one of the user level and the operator level may be specified for other cases. For every case, the setting section 13 specifies the level of information disclosure to show to what extent the data for customer support or the website data will be disclosed. The specified results are recorded in the rule table along with the identification information of the data for customer support or of the website data.

The number of cases that are recorded in the rule table is different between the data for customer support and the website data. For the data for customer support, six combinations of the user levels and the operator levels are recorded. For the website data, three cases are recorded in view of only the user levels. FIG. 3 shows the levels of information disclosure (a level "0", a level "1", a level "2", and a level "3") of the data for customer support. A smaller value of the level of information disclosure means a smaller amount of information that will be disclosed. This is described with reference to FIGS. 4A to 4D.

Figure 4A:
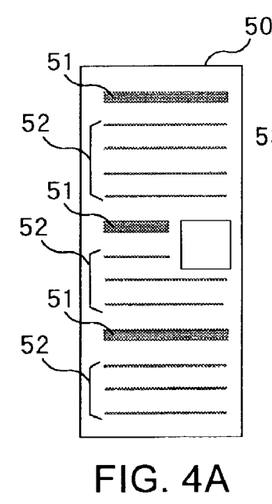
FIG. 4A shows to what extent information will be disclosed at the level "3"

FIG. 4 shows page examples of an electronic manual 50 that are to be displayed on an operator terminal 4 according to the level of information disclosure. FIG. 4A shows to what extent the electronic manual 50 will be disclosed at the level "3". As shown in the figure, headings 51 and their associated contents 52 are fully displayed for the operator on the display unit of the operator terminal 4 at the level "3". Typically, an original electronic manual is displayed without having been subjected to any modification.

Figures 4B, 4C:
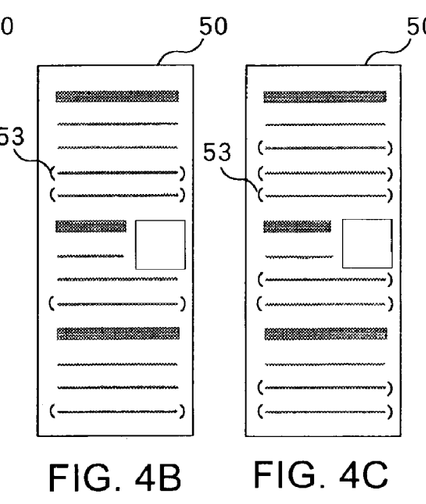
FIG. 4B shows to what extent information will be disclosed at the level "2"
FIG. 4C shows to what extent information will be disclosed at the level "1"

FIG. 4B shows to what extent the electronic manual 50 will be disclosed at the level "2". Compared with the disclosed information at the level "3", the contents 52 are displayed on the display unit of the operator terminal 4 but the headings 51 and skipped texts 53 in parentheses are omitted at the level "2". The operators may skip the skipped texts 53 so that the skipped texts are visually distinguished from the remainders (i.e., the headings 51 and the contents 52). In this embodiment, a different color is specified for the skipped texts 53 than for the remainders in order to train the operators.

Figure 4D:
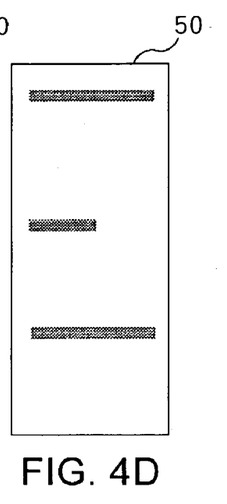
FIG. 4D shows to what extent informational will be disclosed at the level "0"

FIG. 4C shows to what extent the electronic manual 50 will be disclosed at the level "1". Compared with the disclosed information at the level "2", the more texts are skipped as the skipped texts 53. The skipped texts 53 may be masked (hidden) completely from the viewpoint of distinguishing the skipped texts 53 and the remainders (the headings 51 and the contents 52). However, the skipped texts appear lighter in color than the headings 51 and the contents 52 in this embodiment. FIG. 4D shows to what extent the electronic manual 50 will be disclosed at the level "0". At the level "0", only the headings 51 which are brief and descriptive of the contents are displayed on the display unit. Thus, the efficiency of providing information can be improved depending on the levels of the user and the operator.

It should be noted that to what extent the electronic manual will be disclosed is determined for the website data in a similar manner to what has been described above, except that only the user levels are taken into consideration to determine the level of information disclosure. Upon being downloaded, the skipped texts are deleted for the case of the website data.

The knowledge level determination section 14 determines the operator level and/or the user level in response to the reception of a request for information. When a direction is received from an operator terminal 4 or a user terminal 6, the level is determined according to the received direction. Without any direction, the user level is determined by analyzing the dialogue between the operator and the user when the request for information is received from one of the operator terminals 4. For example, the user level is determined according to whether a technical term is contained in the dialogue. If a technical term is contained, it is determined according to the type and/or the number of the terms.

The retrieval section 15 retrieves a master copy of the data for customer support from the master database for customer support D11 when a request for information is received from an operator terminals 4. In addition, the retrieval section 15 retrieves requested data from the website database D12 when a request for browsing or downloading information is received from a user terminal 6.

The information editing section 16 edits a master copy of the data for customer support or a master copy of the website data, such as the data as shown in FIG. 4A. In this event, the information editing section edits the master copy of the data to have one of the formats in FIG. 4B to FIG. 4D according to the level of information disclosure. The term "edit" as used herein includes putting parentheses around a character string as shown in FIGS. 4B and 4C, deleting a character string, and adding color information to or changing the font of characters at and around a point of regard region to facilitate visual distinction of the colored portion from the remainders. When the request for information is a request for website data received from the user and when the request is satisfied after the website data are downloaded to the user terminal 6, the term "edit" mainly refers to manipulating the data to limit (reduce) the amount of information to be downloaded.

The output control section 17 controls the display of the edited data on the display unit of the requesting operator terminal 4. The output control section 17 also controls the supply of the edited data to the requesting user terminal 6. This means that the output control section 17 produces a data structure suited to the display unit or the user terminal. The website administration section 18 allows the user terminals 6 to browse the information in the requested website.

<Interactive Voice Response Device>

The interactive voice response device 3 is an automated voice messaging system offering a wide range of support to users which transforms a pre-recorded response to speech by giving it a synthetic voice. The interactive voice response device 3 comprises a voice message information database (not shown) and an information processing unit (not shown). The voice message information database contains voice data for automated response to inquiries. The information processing unit recognizes user utterances and determines whether automated response is available for them. The voice message information database contains synthetic voices that are associated with the text data received from the information server 1 or voice data that were recorded separately.

This interactive voice response device 3 performs speech recognition for a request for information, such as an inquiry, from a user received via the telephone set 5 to determine whether the request can be satisfied only by using the data recorded in the voice message information database. This determination may be made by determining the match between the recognized words and the keywords associated with the data in the voice message information database. When the request from the user can be satisfied only by using the data in the voice message information database, the interactive voice response device 3 automatically responds to the request with the data. On the other hand, when the interactive voice response device 3 fails to recognize speech or determines that the data in the voice message information database are insufficient to make a good response, it issues an instruction to the switchboard 2 to connect the telephone set 5 and one of the operator terminals 4. In such a case, a human operator intervenes.

<Operator Terminals>

The operator terminal 4 is a device that aids operators in assisting inquiring persons. The operator terminal 4 is achieved by the cooperation of hardware components of a computer and a computer program that can be loaded onto a CPU board in the computer. Each operator terminal 4 is connected to an input device (e.g., a keyboard or a mouse) with which an operator can enter commands, a display unit on which electronic manuals and other information are displayed, and a hard disk in which computer programs and various data are recorded. The operator terminal 4 has a communication control mechanism that controls communications with the information server 1 through the internal network. The operator terminal 4 also has a function of recognizing the content of the conversations between a user and an operator.

<Operation Modes>

An example of an operation mode of the system for providing information AS having the above-mentioned configuration is described. On the assumption, the level of information disclosure is specified for the master database for customer support D11 according to the knowledge levels of both of the operator and the user for each electronic information to be provided to the user, such as for each electronic manual of a printing device or for each FAQ information. Thus, the type and the level of information disclosure of the electronic information to be provided are specified. The subject electronic information is edited and produced according to the level of information disclosure.

[Assisting Operators in Dealing With Customers]

Figure 5:
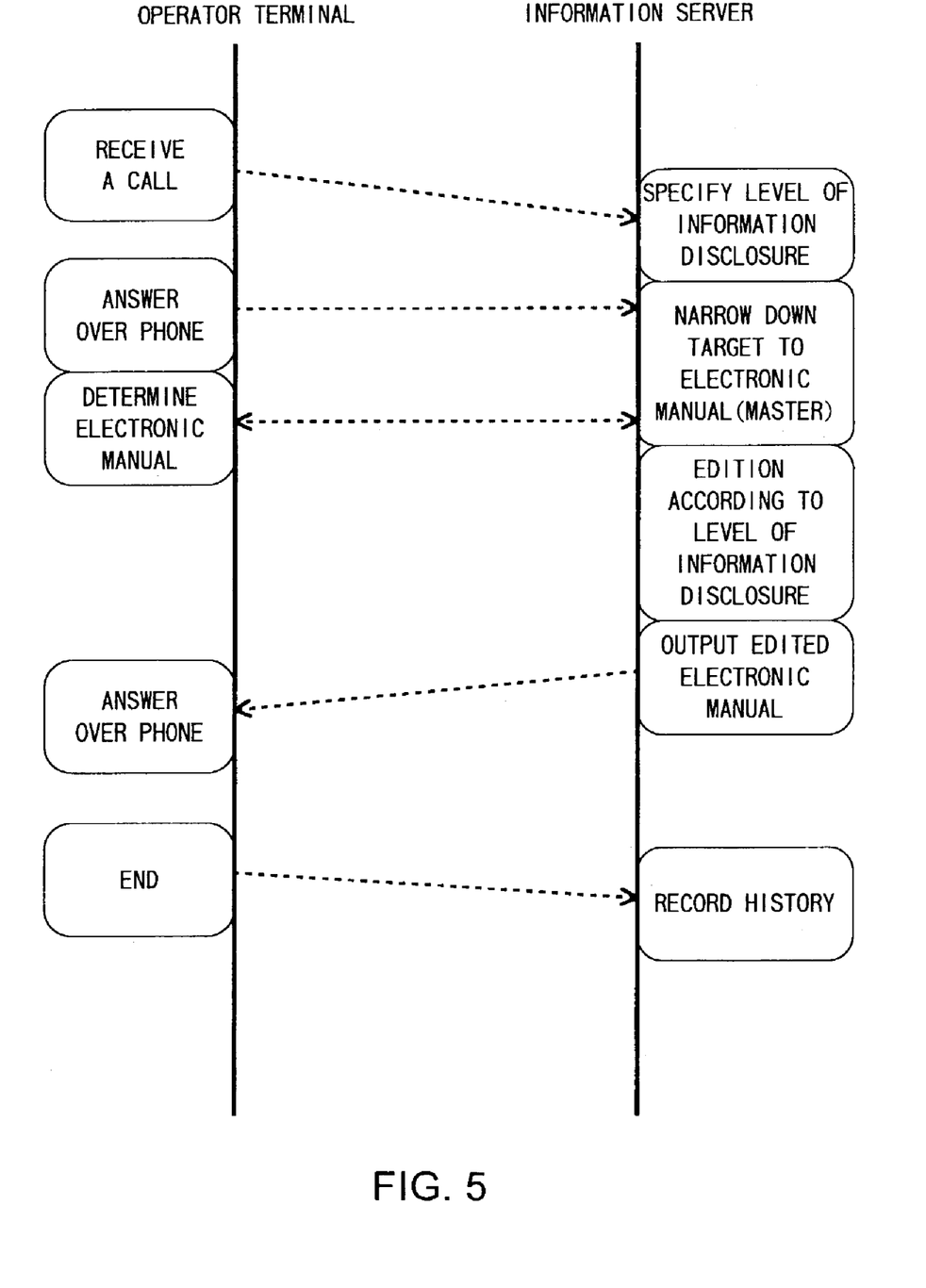
FIG. 5 is a sequence diagram of a communication scheme for dialogue support between an operator terminal and an information server.
Figure 6:
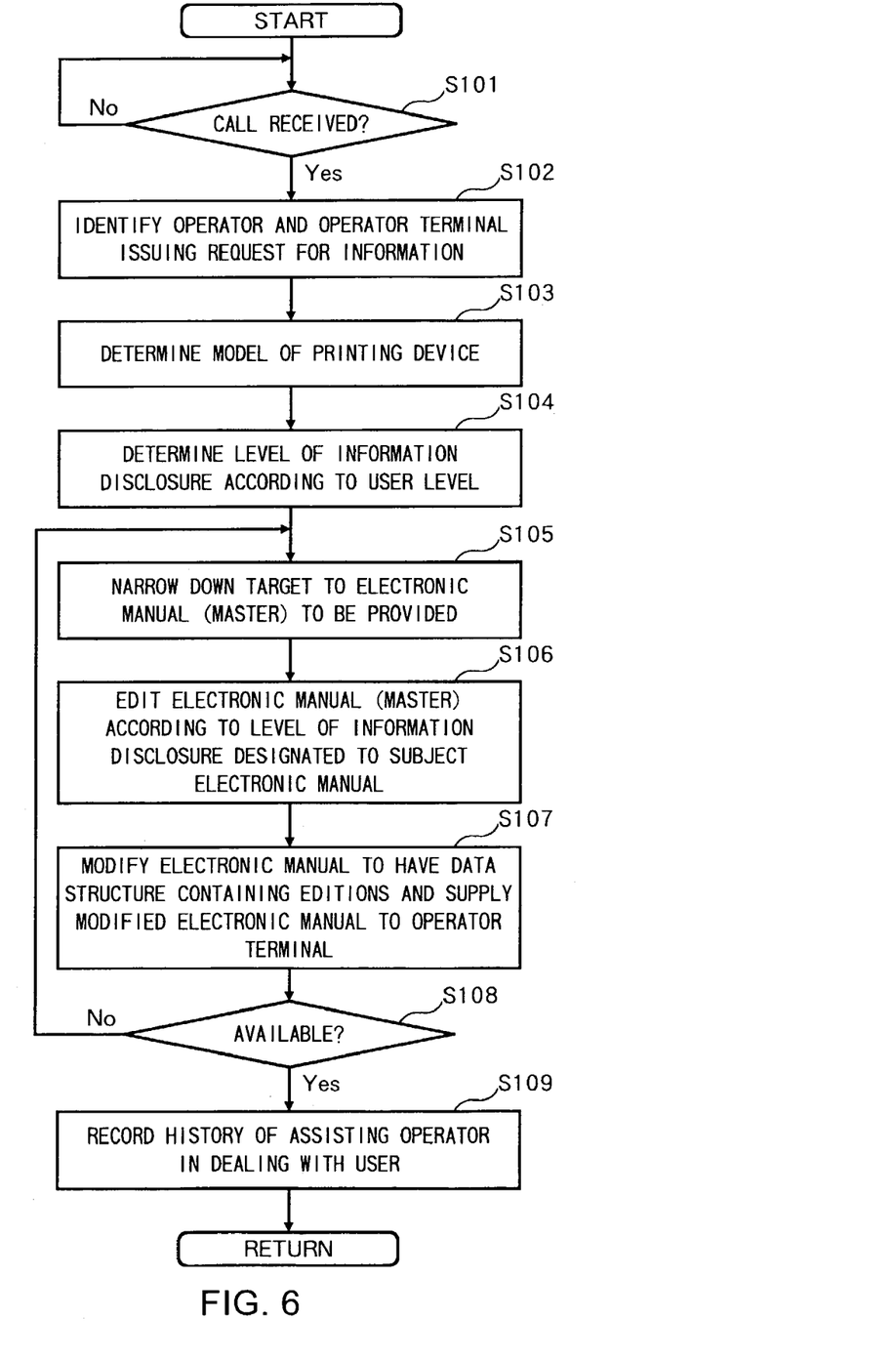
FIG. 6 is a flow chart illustrating the steps which are carried out by the information server for dialogue support.

First, how the operators are assisted in dealing with customers is described with reference to FIGS. 5 and 6. FIG. 5 is a sequence diagram of a communication scheme for dialogue support between an operator terminal 4 and an information server 1. FIG. 6 is a flow chart illustrating the control steps which are carried out by the main control section 10 in the information server 1.

As described above, when the data in the interactive voice response device 3 are enough for dealing with users, automated response can be used without intervention of an operator. Thus, an example is given here of an operator's dealing with inquiries because the automated response by the interactive voice response device 3 is not available. The switchboard 2 transfers a call from a telephone set 5 of a user to one of operators through his or her operator terminals 4. When the call arrives, the operator sends an arrival notification to the information server 1 using the operator terminal 4. From the viewpoint of quickly identifying the information to be provided, it is desirable that the information server 1 is also notified of the operator level.

As shown in FIG. 6, in response to the arrival notification that is sent from the operator terminal 4 (step S101: Yes), the information server 1 identifies one of the operator terminals as the sending operator terminal 4 in reference to the operator terminal database D13 (step S102). This step is performed mainly for the purpose of specifying a return designation and creating a communication history. In addition, the information server 1 determines the model of a printing device according to an instruction from the operator or according to the results of speech recognition for the dialogue between the operator and the user (step S103).

The information server 1 successively receives the results of speech recognition for the dialogue between the operator and the user, from the operator terminal 4. It automatically specifies the user level (e.g., the level "1") to determine the above-mentioned level of information disclosure (step S104). The user level is determined according to whether a technical term in the field of the printer devices is contained in the dialogue between the user and the operator. If a technical term is contained, it is determined according to the type and the frequency of the appearance of the terms. The technical terms for this decision are previously stored in the master database for customer support D11.

In the process of specifying the level of information disclosure or after the specification of it, the information server 1 narrows down the target to an electronic manual (master) to be provided. More specifically, the information server 1 extracts keywords from the results of speech recognition for the user utterances, according to the instruction from the operator. The keywords are used to narrow down the target to pages at certain levels of the electronic manual in the master database for customer support D11 (step S105). For example, the information server 1 recognizing the user saying "PM" narrows down the pages of the electronic manual to those containing a "list of PM series printers" according to the keyword "PM". The information server 1 narrows down the pages to those containing "PM XXX*" which is a name of a model in the PM series printers when the information server 1 recognizes the user saying "PM XXX". The information server 1** narrows down the pages to those containing a "list of PM XXX options" when it recognizes the user saying "option". The operator then asks the user some questions about the phenomena in the printing device that the user comes across. For example, when the electronic manual contains some other information at a lower level or levels, such as "No ink is coming out at all", or "My printer does not print a specific color", the related pages are obtained according to the specified keywords.

In the process of narrowing down the target, indices of the electronic manual may be sent to the operator terminal 4 to let the operator select one or some of the indices (in the case shown in FIG. 5). Alternatively, the information server 1 may make decisions independently on its own accord.

When a single target is obtained by narrowing down the electronic manuals, the information server 1 edits the subject electronic manual according to the level of information disclosure that is designated to the user level and the operator level (step S106). The information server 1 modifies the electronic manual to have a data structure containing the editions, and supplies the modified electronic manual to the associated operator terminal 4 (step S107). The operator terminal 4 directs the display unit thereof to display the electronic manual.

The operator deals with the user using the electronic manual that is being displayed. The electronic manual on his or her display unit may be useless for the operator. In such a case, the operator notifies the information server 1 of the fact that the electronic manual is not worth, through the operator terminal 4. In response to this, the information server 1 repeats the operations after the step S105 (step S108: No).

When the communications over the phone using the electronic manual provided by the information server 1 have been completed, the operator terminal 4 notifies the information server 1 of the completion. In response to this notification, the information server 1 records the history of assisting the operator in dealing with the user, in the history database D15 and terminates the series of operations (step S108: Yes, S109). The operator is thus assisted in the manner described above.

[Request for Information from User]

Figure 7:
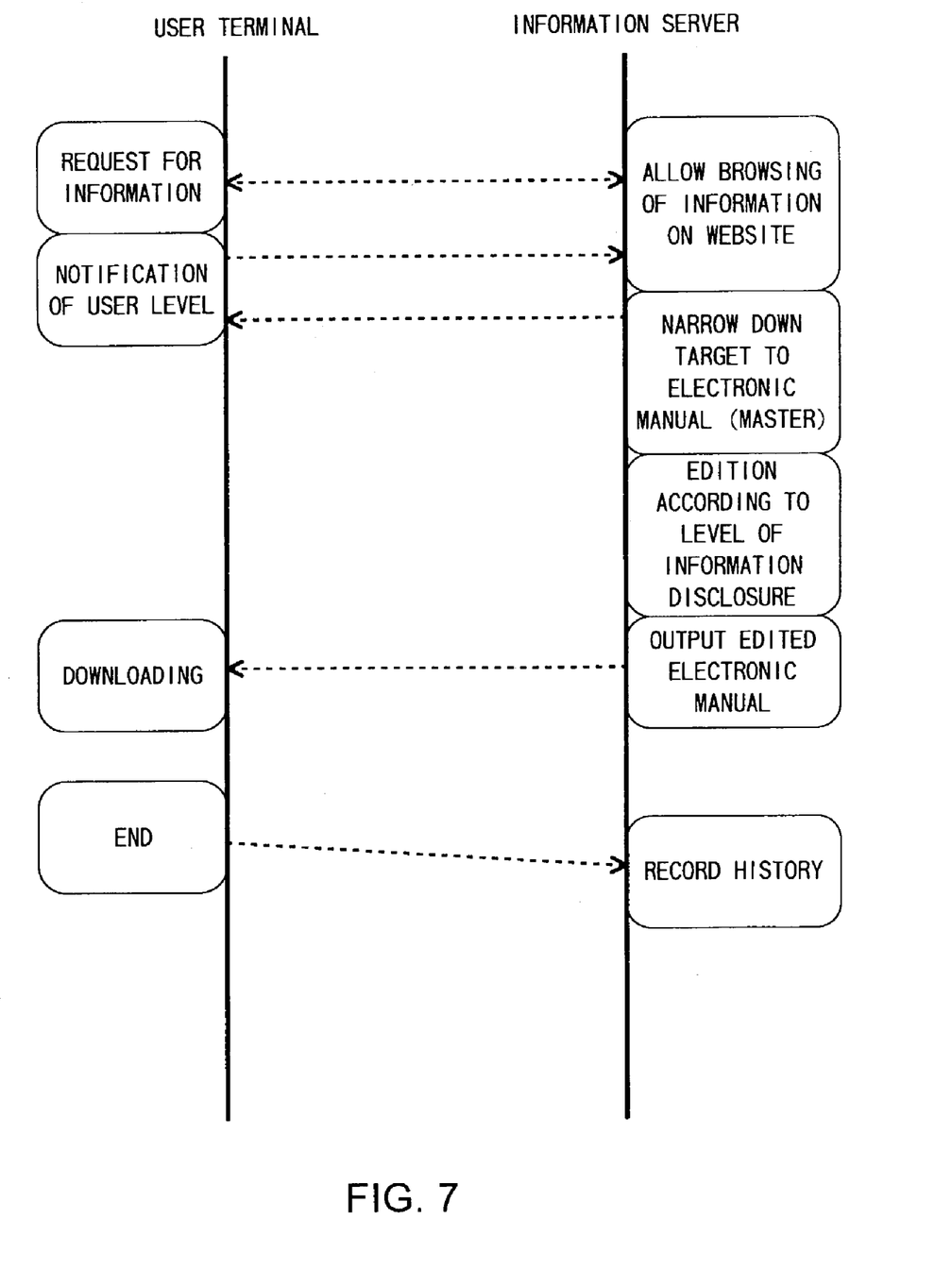
FIG. 7 is a sequence diagram of a communication scheme between a user terminal and an information server when a user directly accesses a website.
Figure 8:
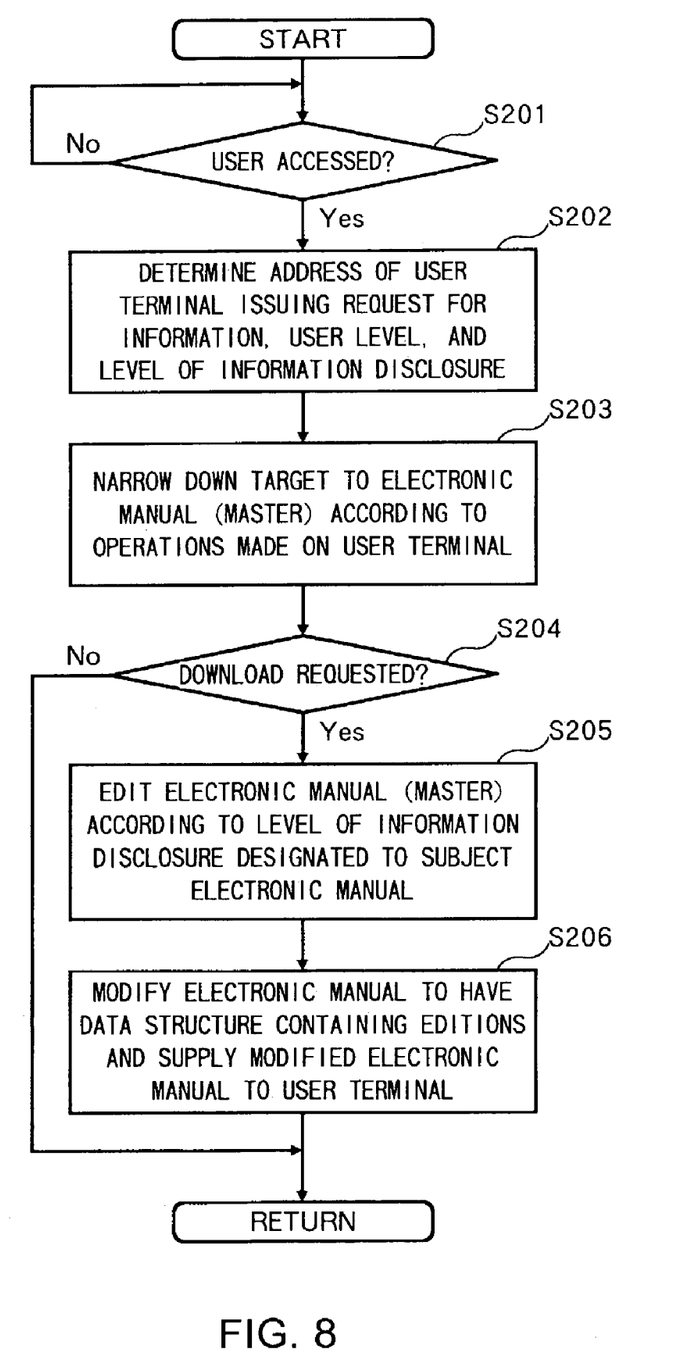
FIG. 8 is a flow chart illustrating the steps which are carried out by the information server for user accesses.

Next, how the present invention works when a user directly accesses a website is described with reference to FIGS. 7 and 8. FIG. 7 is a sequence diagram of a communication scheme between the user terminal 6 and the information server 1. FIG. 8 is a flow chart of control steps which are carried out by the main control section 10 in the information server 1.

As shown in FIG. 8, the information server 1 establishes a communication channel with a user terminal 6 according to access of a user of the user terminal 6 (step S201: Yes). The access may be browsing of information or a request for information that is made through the user terminal 6. The information server 1 specifies the address of the associated user terminal 6 to prompt the user to enter the user level. In response to the reception of a user level, the information server 1 determines the received user level as the level of the user who is manipulating the user terminal 6. The information server 1 then determines the level of information disclosure according to the user level received (step S202).

In addition, the information server 1 narrows down the target to an electronic manual (master) to be provided, according to operations made on the user terminal 6 (step S203). Eventually, a single electronic manual is obtained. If a downloading request is received from the user terminal 6, the information server 1 edits the electronic manual according to the level of information disclosure (step S204: Yes, S205). The information server 1 modifies the electronic manual to have a data structure containing the editions, and supplies the modified electronic manual to the user terminal 6 (step S206). When the downloading is correctly terminated by the user terminal 6 and browsing and requesting information are ended accordingly, the user terminal 6 notifies the information server 1 of it. In response to this notification, the information server 1 records the history of the series of operations in the history database D15 and terminates the operations.

The system for providing information AS according to this embodiment specifies the level of information disclosure for each electronic manual according to the user level and/or the operator level. In response to the reception of a request for information from a user or an operator, the electronic manual associated with the request is edited according to the level of information disclosure that is determined to be suited to the user level and/or the operator level. The edited version of the electronic manual is provided to the user or the operator. Consequently, the same single electronic manual can be used for those having a wealth of knowledge and those less knowledgeable in a different way of information provision. For example, unnecessary information is deleted for those having a wealth of knowledge to reduce the time necessary for exchanging information. This solves conventional problems by achieving a mechanism for providing information according to what is actually required.

In assisting conversations between a user and an operator, a predetermined voice question is supplied from the operator to the user. The answer of the question is subjected to speech recognition to automatically determine the user level of the user. The necessity of operators determining a user level to select information can be eliminated, which reduces burdens on the operators. Furthermore, the electronic manual is edited using the rules of providing information which is associated with both of the user level and the operator level. This advantageously facilitates the communication between a user and an operator.

It is unnecessary to prepare electronic manuals for all knowledge levels because it is possible to change the range to be read or the size to be read from a single electronic manual according to the user level and/or the operator level. The efficiency of information recording can be improved accordingly.

MODIFIED EXAMPLE

While this embodiment has thus been described in conjunction with the case where the manner of presenting the electronic manual is varied according to the rules of providing information, i.e., the levels of information disclosure specified according to the user level and/or the operator level, it should be understood that the electronic information is not limited to such electronic manuals. For example, rules of providing information may be determined to change the order of reading files according to the user level and/or the operator level and the files may be edited according to these rules of providing information. In such a case, the number of files to be read is less for a request for information from a person who has a relatively much knowledge.

While the above-mentioned embodiment is for the case where the speech recognition is performed by the interactive voice response device 3 and the operator terminal 4, voice data representing the dialogue between the user and the operator may be obtained by the operator terminal 4 and the voice data may be supplied to the information server 1 to perform the speech recognition by the information server 1.

As apparent from the above, according to the present invention, those having a wealth of knowledge and those less knowledgeable are given different levels of electronic information. A request-based mechanism for efficiently providing information can be achieved.

What is claimed is:

1. A method for providing electronic information, said method being carried out on a computer system having an information storage device in which electronic information is recorded, the electronic information being to be supplied to a person requesting the information, said method comprising the steps of:

specifying rules of providing information according to different knowledge levels;

determining a knowledge level of the person requesting the information in response to the reception of a request for information;

editing the electronic information that corresponds to the received request for information according to a rule of providing information designated to the knowledge level obtained from the information storage device; and supplying the edited electronic information to the person requesting the information.

2. A method for providing electronic information, said method being carried out on a computer system having a communication mechanism and an information storage device in which electronic information for dialogue support is recorded, the communication mechanism performing two-way communications with an operator terminal that is manipulated by an operator who orally answers questions about a predetermined product from an inquiring person, said method comprising the steps of:

specifying rules of providing information according to different knowledge levels for each electronic information;

receiving a request for information from the operator terminal through the communication mechanism;

determining a knowledge level of the inquiring person in response to the reception of the request for information;

editing the electronic information that corresponds to the received request for information according to a rule of providing information designated to the knowledge level that has been determined; and supplying the edited electronic information to the operator terminal through the communication mechanism.

3. The method as claimed in claim 2, wherein the knowledge level of the inquiring person is automatically determined by speech recognition of answers to questions from the inquiring person who follows directions given by the operator.

4. The method as claimed in claim 2, wherein said step of determining the knowledge level includes determining a knowledge level of the inquiring person and a knowledge level of the operator and editing the electronic information according to a rule of providing information based on the knowledge levels.

5. A system for providing electronic information comprising:

a communication mechanism for two-way communications with an information processing terminal that is manipulated by a person requesting information;

an information storage device in which electronic information to be supplied to the person requesting information is recorded;

setting means for specifying rules of providing information according to different knowledge levels;

request for information receiving means for receiving a request for information from the information processing terminal through said communication mechanism;

knowledge level determination means for determining a knowledge level of the person requesting information in response to the reception of the request for information by said request for information receiving means;

information editing means for editing the electronic information that corresponds to the received request for information according to a rule of providing information designated to the knowledge level determined by said knowledge level determination means; and information output means that produces the electronic information edited by said information editing means to the information processing terminal through said communication mechanism.

6. The system as claimed in claim 5, wherein said information editing means edits the electronic information according to a rule of providing information that varies a range or a size of the portion to be read of one electronic information recorded in said information storage device, in accordance with each of the knowledge levels.

7. The system as claimed in claim 5, wherein said information processing terminal is connected to an information display unit, the electronic information being an electronic document that can be displayed on the information display unit, the electronic document containing a point of regard region, the contents within the point of regard region being displayed in a different display appearance from the remainders of the same electronic document, and wherein said information editing means edits the electronic information according to a rule of providing information that varies the point of regard region in accordance with each of the knowledge levels.

8. The system as claimed in claim 7, wherein the knowledge levels include a first level at which only a summary of the electronic document is displayed, a second level at which an area which is intended to be read by the person requesting information and an area to be skipped are distinguished, a third level at which the skipped area is displayed in a different manner from the read area, and a fourth level at which all areas are displayed.

9. The system as claimed in claim 5, wherein the electronic information is two or more files which are hierarchically arranged in a predetermined order in said information storage device, and wherein said information editing means edits the electronic information according to a rule of providing information that varies the order of reading the files in accordance with each of the knowledge levels.

10. The system as claimed in claim 9, wherein less files are to be read for a relatively higher knowledge level.

11. A system for providing electronic information comprising:

a communication mechanism for two-way communications with an operator terminal that is manipulated by an operator who orally answers questions about a predetermined product from an inquiring person;

an information storage device in which electronic information for dialogue support is recorded;

setting means for specifying rules of providing information according to different knowledge levels for each electronic information;

request for information receiving means for receiving a request for information from the operator terminal through said communication mechanism;

knowledge level determination means for determining a knowledge level of the inquiring person in response to the reception of the request for information by said request for information receiving means;

information editing means for editing the electronic information that corresponds to the received request for information according to a rule of providing information designated to the knowledge level determined by said knowledge level determination means; and information output means that produces the electronic information edited by said information editing means to the operator terminal through said communication mechanism.

12. The system as claimed in claim 11, wherein said knowledge level determination means determines a knowledge level of the inquiring person and a knowledge level of the operator.

13. The system as claimed in claim 11, wherein said knowledge level determination means determines a knowledge level of the inquiring person according to the type and/or the number of technical terms contained in a dialogue between the user and the operator.

14. The system as claimed in claim 13, wherein said knowledge level determination means comprises speech recognition means that extracts a technical term contained in the dialogue by means of speech recognition.

15. A computer program that forms, in a computer having a communication mechanism for two-way communications with an information processing terminal that is manipulated by a person requesting information, and an information storage device in which electronic information to be supplied to the person requesting information is recorded, the following:

setting means for specifying rules of providing information according to different knowledge levels;

request for information receiving means for receiving a request for information from the information processing terminal through said communication mechanism;

knowledge level determination means for determining a knowledge level of the person requesting information in response to the reception of the request for information by said request for information receiving means;

information editing means for editing the electronic information that corresponds to the received request for information according to a rule of providing information designated to the knowledge level determined by said knowledge level determination means; and information output means that produces the electronic information edited by said information editing means to the information processing terminal through said communication mechanism.

16. A computer program that forms, in a computer having a communication mechanism for two-way communications with an operator terminal that is manipulated by an operator who orally answers questions about a predetermined product from an inquiring person, and an information storage device in which electronic information for dialogue support is recorded, the following:

setting means for specifying rules of providing information according to different knowledge levels for each electronic information;

request for information receiving means for receiving a request for information from the operator terminal through said communication mechanism;

knowledge level determination means for determining a knowledge level of the inquiring person in response to the reception of the request for information by said request for information receiving means;

information editing means for editing the electronic information that corresponds to the received request for information according to a rule of providing information designated to the knowledge level determined by said knowledge level determination means; and information output means that produces the electronic information edited by said information editing means to the operator terminal through said communication mechanism.

* * * * *